United States Patent
Bragstad et al.

(10) Patent No.: US 9,716,738 B2
(45) Date of Patent: Jul. 25, 2017

(54) DEPLOYING A PORTION OF A STREAMING APPLICATION TO ONE OR MORE VIRTUAL MACHINES ACCORDING TO COST

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 214 days.

(21) Appl. No.: 14/276,156

(22) Filed: May 13, 2014

(65) Prior Publication Data

US 2015/0331702 A1     Nov. 19, 2015

(51) Int. Cl.
- *G06F 9/45* (2006.01)
- *H04L 29/06* (2006.01)
- *G06F 9/455* (2006.01)
- *H04L 12/927* (2013.01)
- *H04L 29/08* (2006.01)
- *G06F 9/54* (2006.01)

(52) U.S. Cl.
CPC .............. *H04L 65/80* (2013.01); *G06F 9/455* (2013.01); *G06F 9/45533* (2013.01); *G06F 9/45558* (2013.01); *G06F 9/54* (2013.01); *H04L 47/805* (2013.01); *H04L 67/10* (2013.01); *G06F 2009/4557* (2013.01)

(58) Field of Classification Search
CPC .................................................. G06F 9/45533
See application file for complete search history.

(56) References Cited

U.S. PATENT DOCUMENTS

| | | | |
|---|---|---|---|
| 8,239,847 B2 | 8/2012 | Yu et al. | |
| 8,490,072 B2 | 7/2013 | Andrade et al. | |
| 8,521,770 B1 | 8/2013 | Black | |
| 8,949,410 B2* | 2/2015 | Patel | H04L 67/1031 709/200 |
| 9,208,032 B1* | 12/2015 | McAlister | G06F 11/1435 |
| 2003/0135621 A1* | 7/2003 | Romagnoli | G06F 9/4881 709/226 |
| 2008/0098123 A1 | 4/2008 | Huang et al. | |
| 2008/0104608 A1* | 5/2008 | Hyser | G06F 9/5027 718/105 |

(Continued)

OTHER PUBLICATIONS

Minas et al., The Problem of Power Consumption in Servers, 2009.*

(Continued)

*Primary Examiner* — Charlie Sun
(74) *Attorney, Agent, or Firm* — Martin & Associates, LLC; Derek P. Martin (57) ABSTRACT

A streams manager monitors cost of one or more VMs hosting a streaming application, determines when cost can be reduced, and requests a cloud manager provision one or more VMs that have a lower cost. In response, the cloud manager provisions the VM(s) that have the lower cost. The streams manager then deploys a portion of the streaming application to the VM(s), thereby reducing the cost of running the streaming application.

1 Claim, 10 Drawing Sheets

(56) References Cited

U.S. PATENT DOCUMENTS

| | | | |
|---|---|---|---|
| 2011/0219372 A1 | 9/2011 | Agrawal et al. | |
| 2013/0091507 A1 | 4/2013 | Wu et al. | |
| 2013/0097604 A1 | 4/2013 | Simitsis et al. | |
| 2013/0145121 A1 | 6/2013 | Fawcett | |
| 2014/0026133 A1* | 1/2014 | Parker | G06F 9/5083 718/1 |
| 2015/0067169 A1* | 3/2015 | Povolny | H04L 47/781 709/226 |
| 2015/0143366 A1* | 5/2015 | Suragi Math | G06F 9/5072 718/1 |

OTHER PUBLICATIONS

Bragstad et al., "Deploying a Portion of a Streaming Application to One or More Virtual Machines According to Cost" U.S. Appl. No. 14/304,893, filed Jun. 14, 2014.
List of IBM Patents or Patent Applications Treated As Related.

* cited by examiner

| Cost Thresholds | |
|---|---|
| VM1 | $1.50/hour |
| VM2 | $1.00/hour |
| VM3 | $4.00/hour |

DEPLOYING A PORTION OF A STREAMING APPLICATION TO ONE OR MORE VIRTUAL MACHINES ACCORDING TO COST

BACKGROUND

1. Technical Field

This disclosure generally relates to streaming applications, and more specifically relates to lowering the cost of running a streaming application by deploying a portion of the streaming application to one or more virtual machines according to cost of the virtual machines.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

A streams manager monitors cost of one or more VMs hosting a streaming application, determines when cost can be reduced, and requests a cloud manager provision one or more VMs that have a lower cost. In response, the cloud manager provisions the VM(s) that have the lower cost. The streams manager then deploys a portion of the streaming application to the VM(s), thereby reducing the cost of running the streaming application.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

A streams manager monitors cost of one or more VMs hosting a streaming application, determines when cost can be reduced, and requests a cloud manager provision one or more VMs that have a lower cost. In response, the cloud manager provisions the VM(s) that have the lower cost. The streams manager then deploys a portion of the streaming application to the VM(s), thereby reducing the cost of running the streaming application. The cost at issue in this patent application is monetary value of resources, as described in detail below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
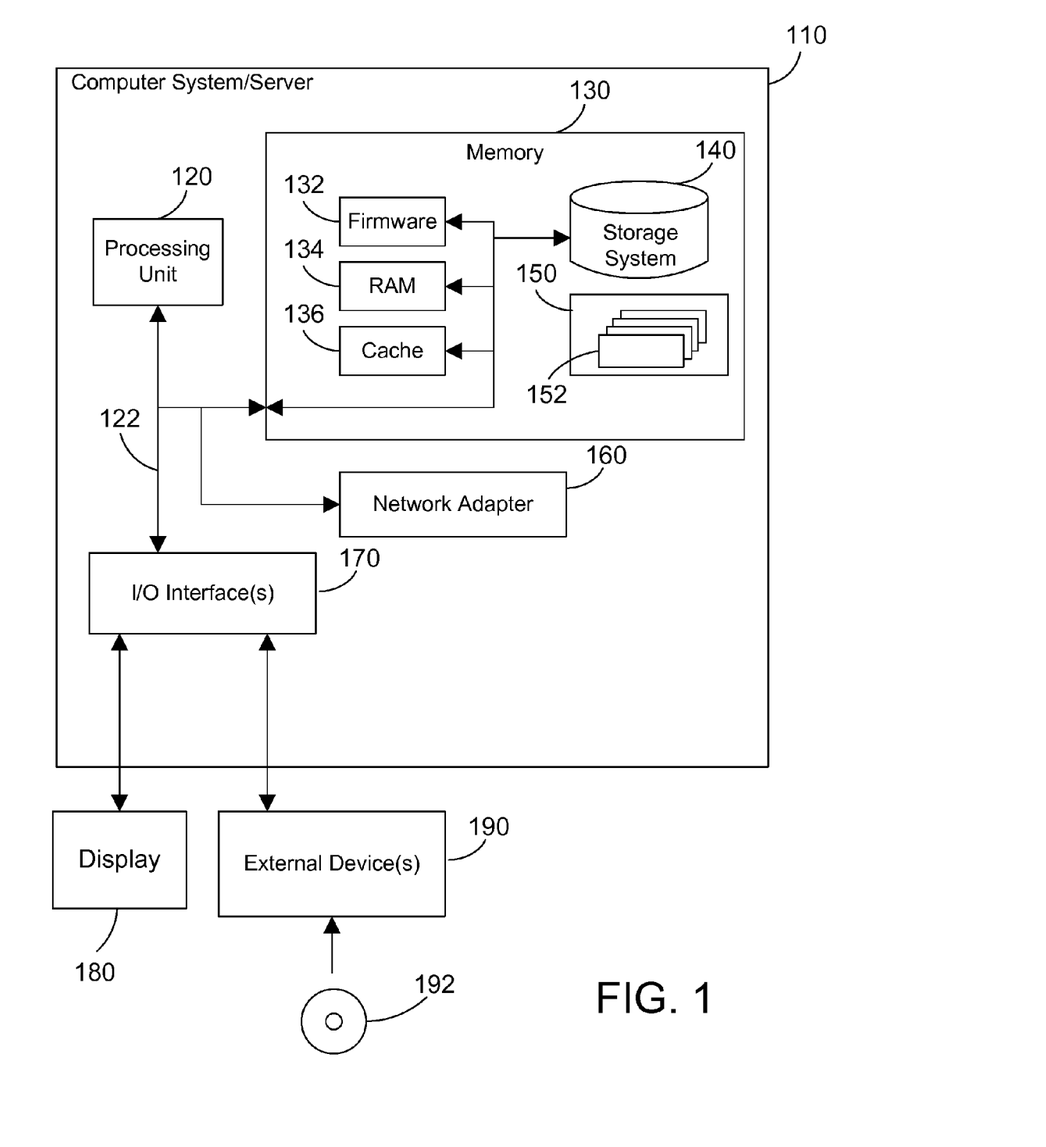
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
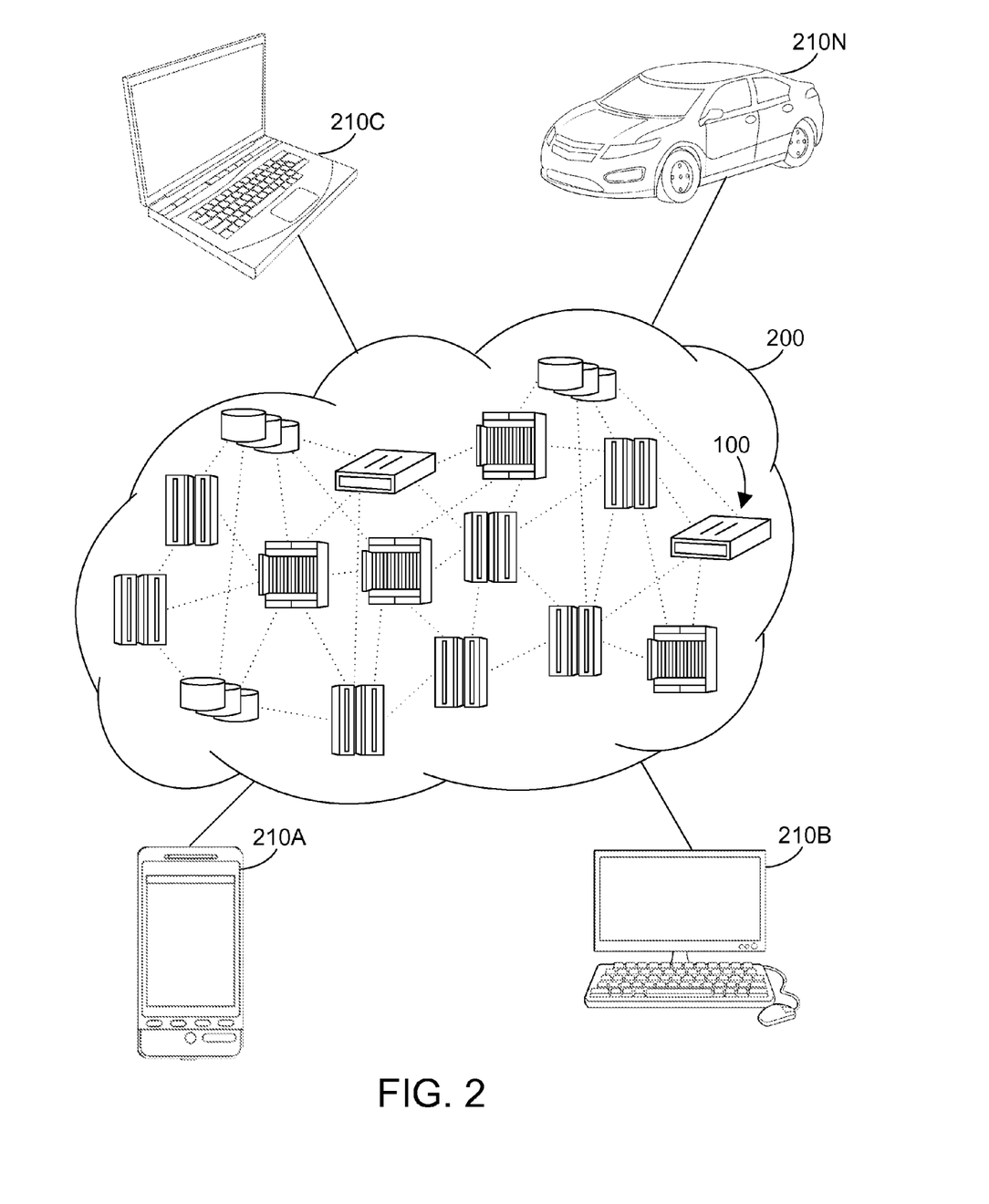
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
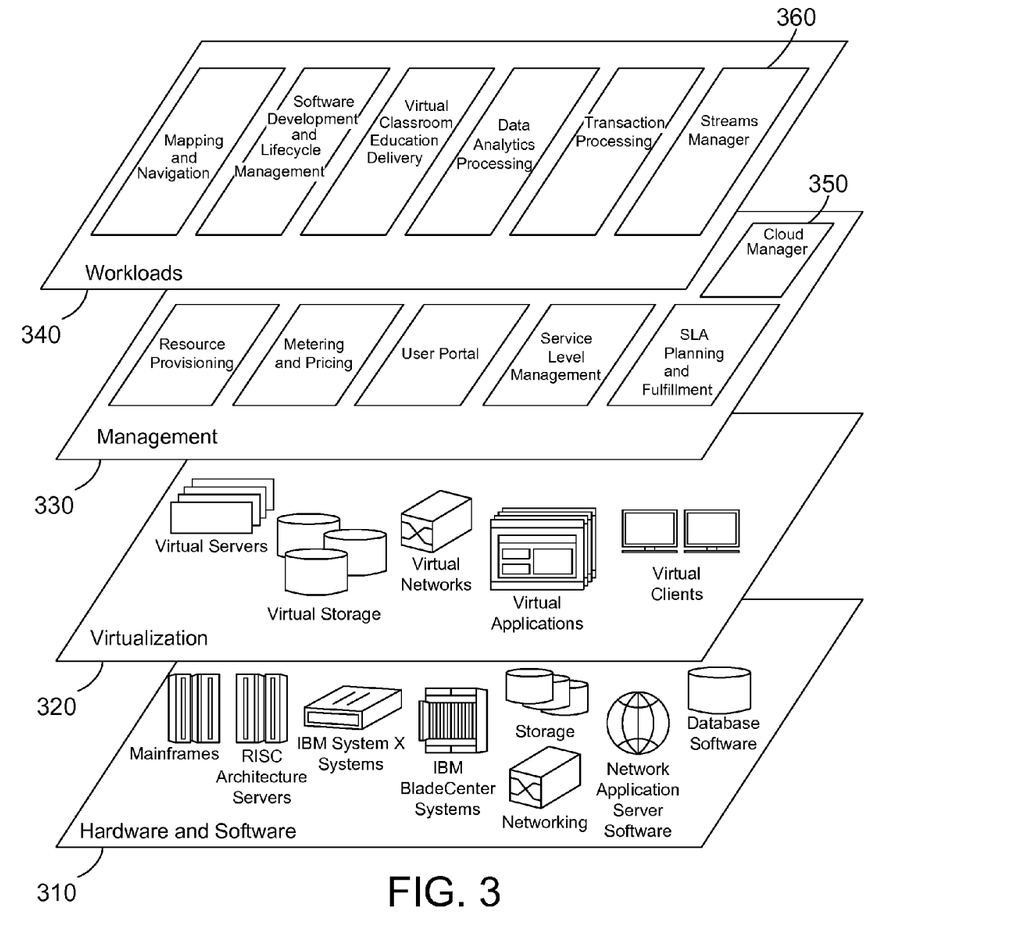
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing;

transaction processing; and a streams manager 360, as discussed in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
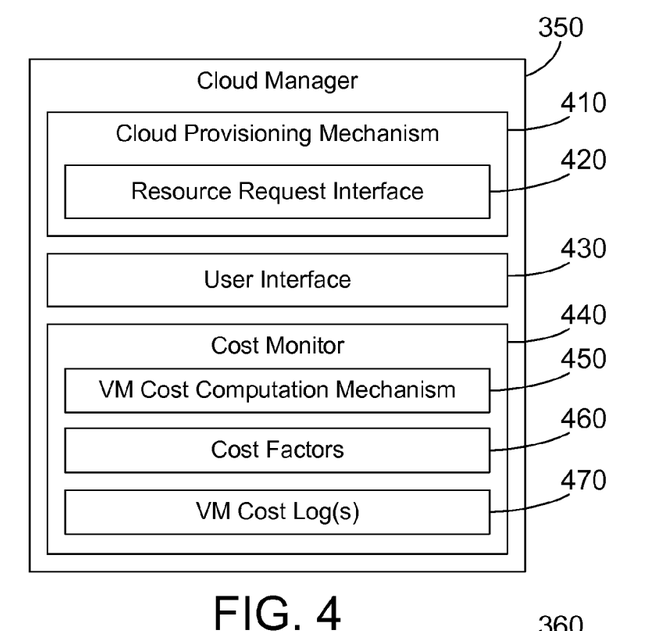
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request virtual machines from the cloud manager 350 without human intervention. The cloud manager 350 also includes a user interface 430 that allows a user to interact with the cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user.

The cloud manager 350 also includes a cost monitor 440. The cost monitor 440 includes a virtual machine cost computation mechanism 450, one or more cost factors 460, and virtual machine cost logs 470. The virtual machine cost computation mechanism 450 computes the cost of virtual machines according to the cost factors 460, discussed in more detail below. The cost of available virtual machines is logged to one or more VM cost logs 470. By logging the cost of available virtual machines to one or more VM cost logs 470, the cloud manager can easily determine the cost for available virtual machines based on the logged cost rather than having to compute the cost for each virtual machine when a virtual machine is requested. Of course, the one or more VM cost logs 470 are optional, because the VM cost computation mechanism 450 could alternatively determine cost of available hosts after a virtual machine is requested. Of course, cloud manager 350 could include many other features and functions known in the art that are not shown in FIG. 4.

Figure 5:
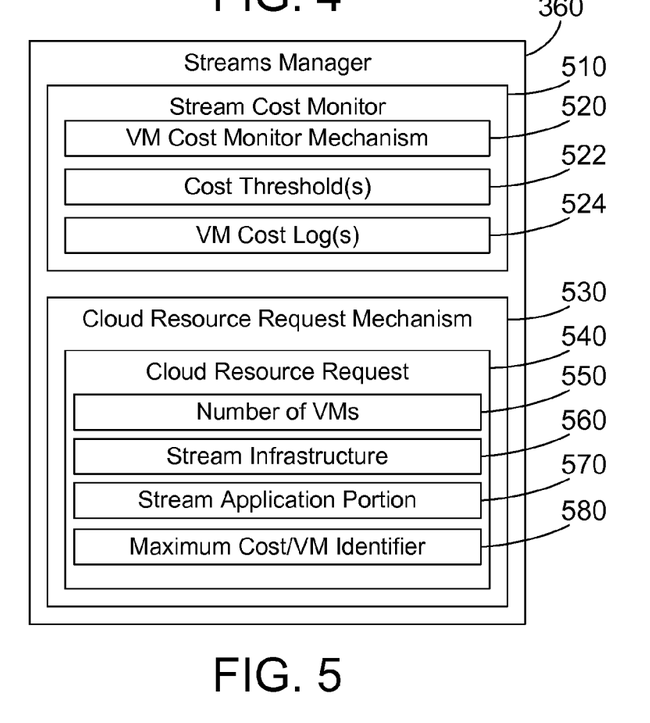
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a stream cost monitor 510 that includes a VM cost monitor mechanism 520, one or more cost thresholds 522, and one or more VM cost logs 524. The VM cost monitor mechanism 520 monitors the cost of VMs used to execute a streaming application. Cost thresholds 522 includes one or more cost thresholds that each specifies a maximum cost for one or more virtual machines. For example, if a streaming application is executed by three VMs, the cost thresholds 522 could include three different cost thresholds, one for each VM. In the alternative, a single cost threshold 522 could specify maximum cost for any VM in the streaming application. Cost threshold(s) 520 can include static thresholds, such as a cost in a given currency for a given time period, and can also include any suitable heuristic for specifying cost of a streaming application as a whole or for specifying cost of one or more operators in a streaming application or one or more operators deployed to a virtual machine. Cost thresholds 520 may include, for example, different thresholds and metrics at the operator level, at the level of a group of operators, and/or at the level of the overall performance of the streaming application.

One or more VM cost logs 524 may include cost of VMs used to execute a streaming application, and may also include cost of one or more VMs available to the cloud manager 350. The cost of VMs available to the cloud manager could be copied from the VM cost logs 470 in the cloud manager to the VM cost logs 524 in the streams manager. Making the cost of available VMs available to the streams manager gives the streams manager some flexibility in determining how the request VMs to reduce the cost of executing a streaming application, as discussed below with reference to FIGS. 8 and 9.

The streams manager 360 determines a portion of the streaming application to deploy to one or more VMs. Note the portion of the streaming application may be a single operator or may be multiple operators. The streams manager 360 uses a cloud resource request mechanism 530 to formulate a cloud resource request 540, which can include information such as a number of VMs to provision 550, stream infrastructure needed in each VM 560, a stream application portion 570 (e.g., one or more operators) for each VM, and other information such as a maximum cost or identifiers of one or more VMs to provision 580.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, could specify operator A and operator B at 570, and could specify a maximum cost at 580. In response, the cloud manager would provision two VMs on one or two servers with the common stream infrastructure that have a cost less than the specified maximum cost, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A with a maximum cost for the first VM, and a second VM with the common stream infrastructure and operator B with a maximum cost for the second VM.

Figure 6:
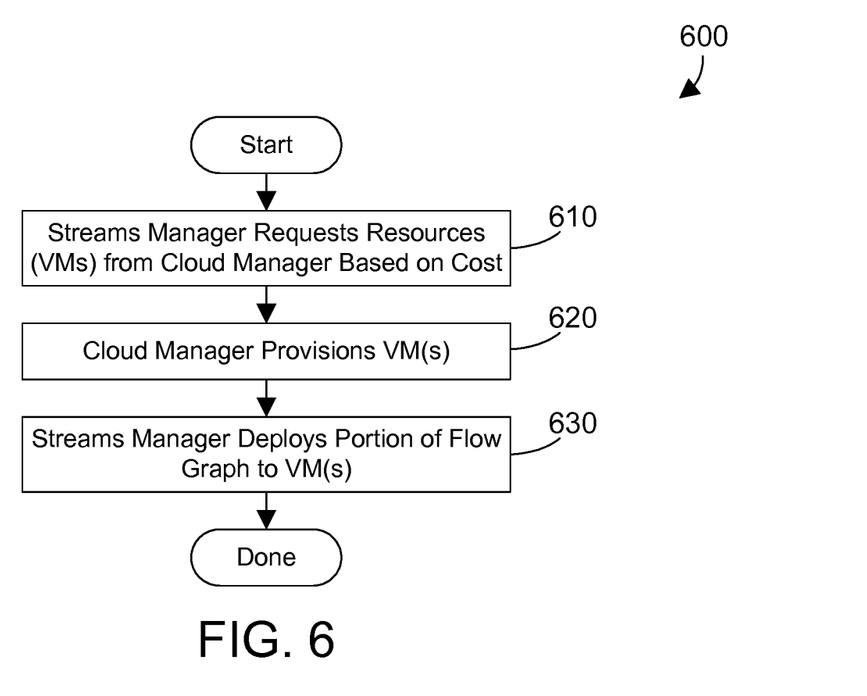
FIG. 6 is a flow diagram of a method for a streams manager to request and receive from a cloud manager virtual machines to improve cost of executing a streaming application.

Referring to FIG. 6, a method 600 shows one suitable example for reducing cost of executing a streaming application, and is preferably performed by the streams manager 360 interacting with the cloud manager 350. The streams manager requests resources, such as VMs, from the cloud manager based on cost (step 610). The cloud manager provisions the VMs (step 620). The streams manager then deploys a portion of the flow graph to the VMs (step 630). When the streaming application is not initially hosted in the cloud, the result will be a hybrid implementation of the streams application, with some portions hosted on a dedicated computer system and other portions hosted by one or more VMs in the cloud.

Figure 7:
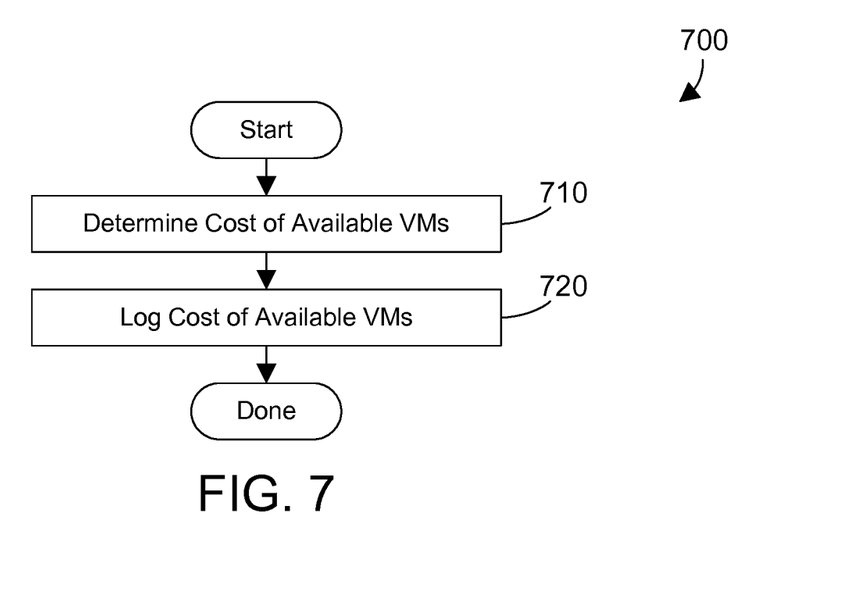
FIG. 7 is a flow diagram of a method for a cloud manager to log cost for available virtual machines.

FIG. 7 shows one suitable example of a method 700 for a cloud manager to log cost information for VMs which it can provision. The cost of available VMs is determined (step 710). The cost of VMs in a public cloud, such as Amazon's Elastic Compute Cloud (EC2), is easy to determine because the cost of VMs in public clouds is published by the cloud provider. The cost of the available VMs is also logged (step 720). The cost log of available VMs in step 720 can be the VM cost logs 470 shown in FIG. 4. By logging cost information for available VMs, the cloud manager can fulfill requests from the streams manager to deploy one or more operators to virtual machines based on cost without the need to determine cost of available VMs after the request is received.

Figure 8:
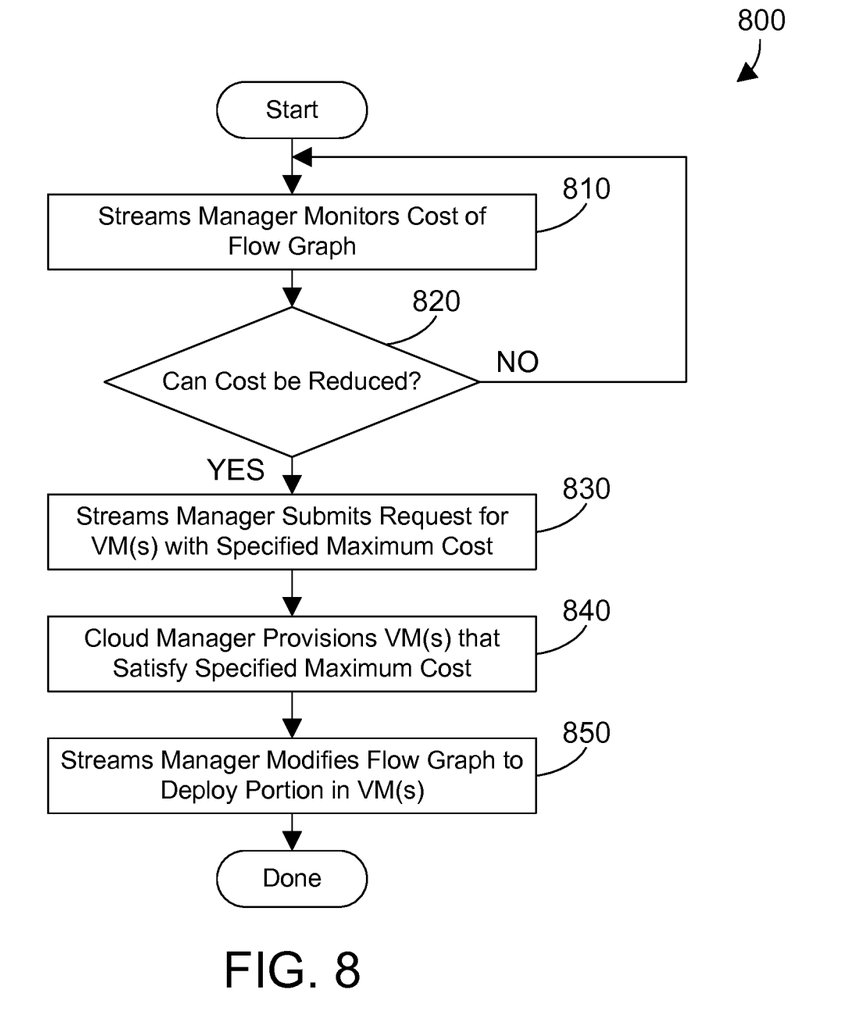
FIG. 8 is a flow diagram of a first exemplary method for improving cost of executing a streaming application by deploying one or more portions of a flow graph to one or more VMs according to a specified maximum cost.

Referring to FIG. 8, a first method 800 shows how a streams manage can reduce the cost of executing a streaming application by deploying a portion of the streaming application to one or more VMs in a cloud. Method 800 is one specific implementation for method 600 shown in FIG. 6. The streams manager monitors cost of a flow graph corresponding to a streaming application (step 810). When the cost cannot be reduced (step 820=NO), method 800 loops back to step 810 and continues. When the cost can be reduced (step 820=YES), the streams manager generates and submits to the cloud manager a request for one or more VMs with a specified maximum cost (step 830). Cloud resource request 540 shown in FIG. 5 and discussed above is one suitable example of such a request. In response to receiving the request from the streams manager, the cloud manager provisions one or more VMs that satisfy the specified maximum cost (step 840). The streams manager then modifies the flow graph to deploy a portion of the flow graph to the one or more VMs (step 850). Method 800 is then done.

Figure 9:
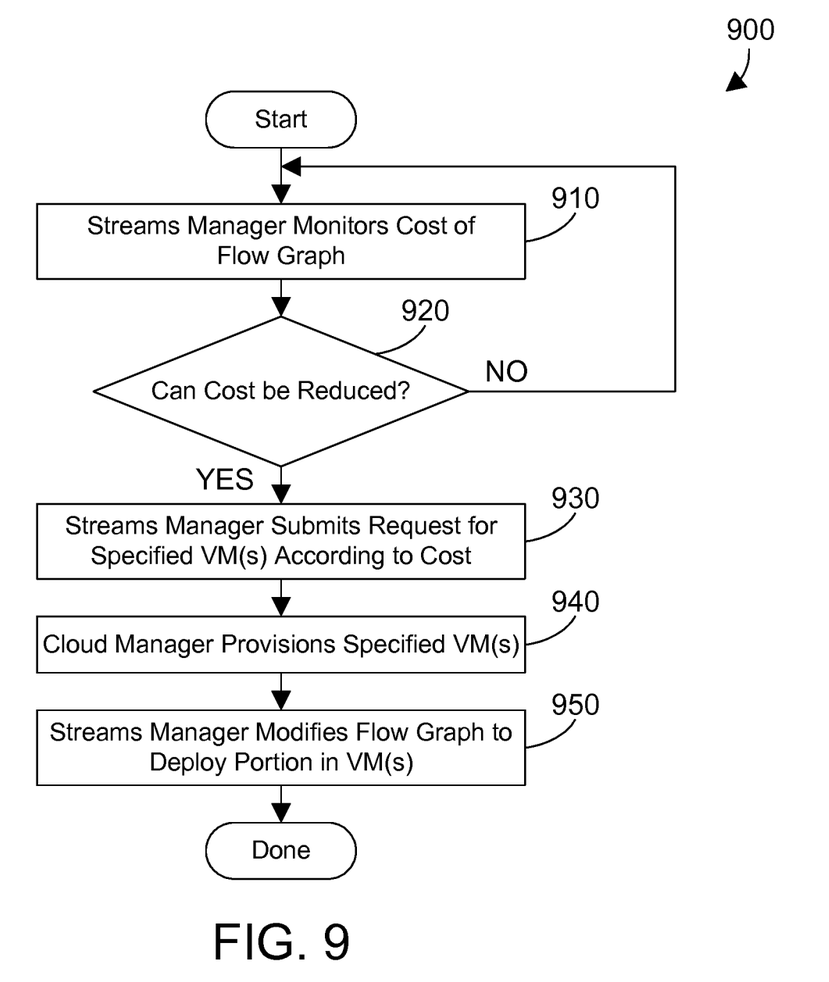
FIG. 9 is a flow diagram of a second exemplary method for improving cost of executing a streaming application by deploying one or more portions of a flow graph to one or more specified VMs that have a desired cost.

Referring to FIG. 9, a second method 900 shows how a streams manager can reduce the cost of executing a streaming application by deploying a portion of the streaming application to one or more VMs in a cloud. Method 900 is another specific implementation for method 600 shown in FIG. 6. The streams manager monitors cost of a flow graph corresponding to a streaming application (step 910). When the cost cannot be reduced (step 920=NO), method 900 loops back to step 910 and continues. When the cost can be reduced (step 920=YES), the streams manager generates and submits to the cloud manager a request for one or more specified VMs (step 930). Cloud resource request 540 shown in FIG. 5 and discussed above is one suitable example of such a request. In response to receiving the request from the streams manager, the cloud manager provisions the one or more specified VMs (step 940). The streams manager then modifies the flow graph to deploy a portion of the flow graph to the one or more VMs (step 950). Method 900 is then done.

One of the differences between method 800 in FIG. 8 and method 900 in FIG. 9 is whether the streams manager or the cloud manager selects the one or more VMs. In method 800 in FIG. 8, the streams manager simply specifies a maximum cost for each VM, and the cloud manager then selects the one or more VMs that satisfy the specified maximum cost. In method 900 in FIG. 9, in contrast, the streams manager identifies from its one or more VM cost logs 524 the cost of available VMs, then specifies to the cloud manager a VM identifier. Note the identifier does not necessarily specify a particular VM, but in the most preferred implementation specifies characteristics or attributes of a particular VM. For example, if the one or more VM cost logs 524 indicate a VM deployed to Amazon's EC2 has a desired cost less than the current cost of a VM executing a portion of the streaming application, the VM identifier 580 in the cloud resource request 540 could specify a VM in EC2. In an alternative implementation, the one or more VM cost logs 524 may include cost for specific VMs available to the cloud manager 350, which would allow the VM identifier 580 to specify a particular VM.

Figure 10:
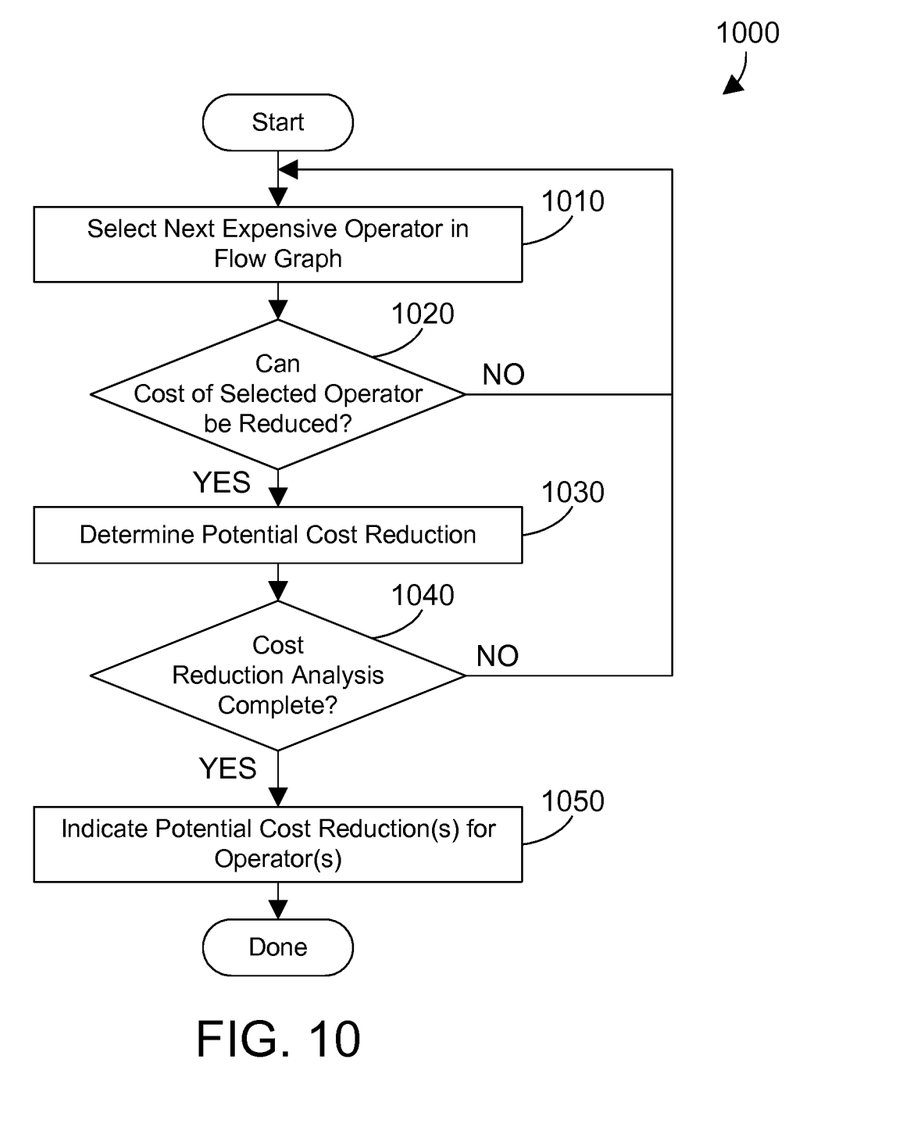
FIG. 10 is a flow diagram of a method for a streams manager to determine potential cost reductions for operators in a flow graph.

FIG. 10 shows a method 1000 that could be implemented to determine whether cost can be reduced, as shown at 820 in FIG. 8 and 920 in FIG. 9. The streams manager initially selects the most expensive operator in the flow graph (step 1010). Most expensive operator in this context means the operator that uses the highest monetary value of resources. When the cost of the selected operator cannot be reduced (step 1020=NO), method 1000 loops back to step 1010 and continues. When cost of the selected operator can be reduced (step 1020=YES), the potential cost reduction is determined (step 1030). When the cost reduction analysis is not complete (step 1040=NO), method 1000 loops back and continues by selecting the next most-expensive operator (step 1010). When the cost reduction analysis is complete (step 1040=YES), the potential cost reduction(s) for the selected operator(s) is indicated to the streams manager (step 1050). Method 1000 is then done. Note the determination of when the cost reduction analysis is complete in step 1040 can be made in many different ways. For example, the cost reduction analysis could be complete when enough operators have been processed to get the overall cost of a portion of the streaming application or the streaming application as a whole below some specified cost threshold. In the alternative, the cost reduction analysis could be complete when a specified number of operators have been selected and processed. In yet another alternative, the cost reduction analysis could be complete based on the time spent executing method 1000. In still another alternative, it may be impossible to reduce the cost of a portion of the streaming application or the streaming application as a whole, so the cost reduction analysis could be complete once all operators have been analyzed, or once all operators that exceed some cost threshold have been analyzed, even if there are no potential cost reductions. The disclosure and claims expressly extend to any suitable way for determining when the cost reduction analysis is complete.

Figure 11:
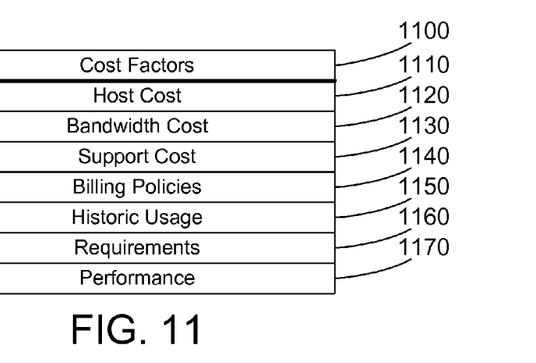
FIG. 11 is a block diagram showing cost factors that can be taken into account when computing cost for a virtual machine.

The cost of a VM can depend on many different factors, some of which are shown by way of example in FIG. 11. Cost factors 1100 shown in FIG. 11 include host cost 1110, which is the cost of hosting the VM. The bandwidth cost 1120 is a cost of the bandwidth used to and from the VM. Support cost 1130 may also be taken into account, which can include any cost associated with supporting the VM. For example, there is a minimum power a host computer system requires even if there one only one VM running on the host computer system. This cost can vary widely since the host may be a stand-alone server that can host a limited number of VMs or may be a massively parallel computer system that can support many VMs. In addition, support cost 1130 can indicate whether a server can be shut down by moving a VM to a different server, and can also indicate whether a server must be started to host a VM. While these incremental costs may be less relevant to immediate optimization, they would be valuable input into longer term planning for internal support. Billing policies 1140 can influence a cost-based decision. Billing policies 1140 can include such things as discounts and overage charges. Discounts could be available based on number of operators or number of VMs. For example, if discounts for increased usage are available, the cost analysis can look at moving enough operators to get the discount, even though their current individual cost is less where they are. In the case of overage charges, the cost of a VM can be partially determined by the overages charges. For example, by ensuring enough buffer remains to ensure the overage is unlikely to occur, this can influence the cost of potential cost reductions.

Historic usage 1150 is another potential cost factor. Historic usage of the host can be used to determine if a peak usage is upcoming or if it will have excess capacity that allows the cost estimate to be adjusted. This could require that a streams manager know how long an operator is needed. For example, if a parallel operator is added to increase throughput, the historic usage can indicate the times when the parallel operator was needed. Another function of historic usage 1150 is to set an expiration for logged costs. Thus, a cost is specified with an expiration time. As the expiration time approaches or is reached, a cost analysis could be repeated to determine if one or more operators should be moved.

Requirements 1160 can also be a potential cost factor. Requirements 1160 can be anything that is a requirement for one or more operators in the streaming application or for the streaming application as a whole. For example, when one or more operators process sensitive or confidential data, the operator(s) could be prevented from being moved to a public cloud. In the alternative, the operator(s) could be moved to a public cloud as long as the sensitive portion of the tuple is encrypted as it leaves the private cloud and is decrypted when it returns from the public cloud. In this scenario, the cost of operators to perform the encryption and decryption may be included in the cost for moving the operator(s) to the public cloud.

Performance 1170 can be another potential cost factor. For example, due to performance or reliability requirements, one instance of the operator in a private cloud may need to be replaced with two instances of the operator in a public cloud. The cost analysis can include the cost of the additional operator as dictated by performance 1170.

Figure 12:
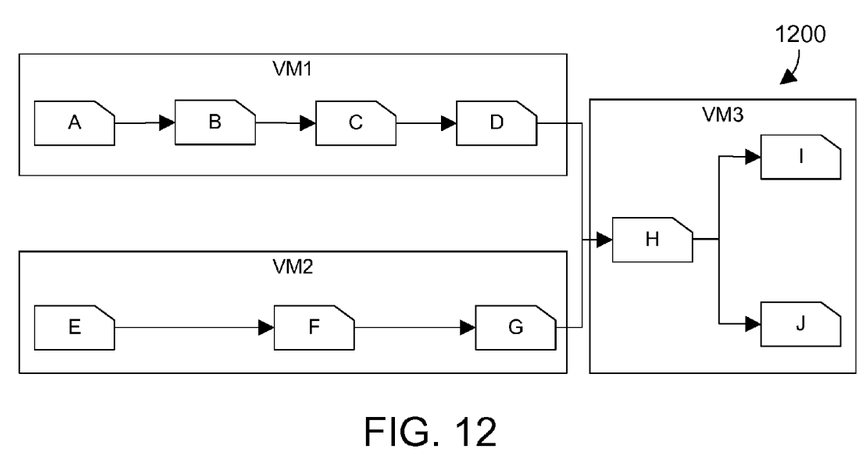
FIG. 12 is a flow diagram of a sample streaming application deployed on three different virtual machines.

A simple example is provided in FIGS. 12-16 to illustrate some of the concepts discussed above. Referring to FIG. 12, a streaming application 1200 includes operators A, B, C, D, E, F, G, H, I and J as shown. Operator A originates a stream of tuples, which is processed by operator B, which outputs tuples. The tuples from operator B are processed by operator C, which outputs tuples to operator D, which processes the tuples and outputs its tuples to operator H. In similar fashion, operator E originates a stream of tuples, which is processed by operator F, which outputs tuples that are processed by operator G, which outputs tuples to operator H. Note that operator H receives tuples from both operator D and operator G. Operator H processes the tuples it receives from operator D and from operator G, and outputs its tuples to operators I and J. This example assumes the streaming application 1200 has operators deployed to three different VMs, as shown in FIG. 12, namely: operators A, B, C and D are deployed to VM1; operators E, F and G are deployed to VM2; and operators H, I and J are deployed to VM3.

Figure 13:
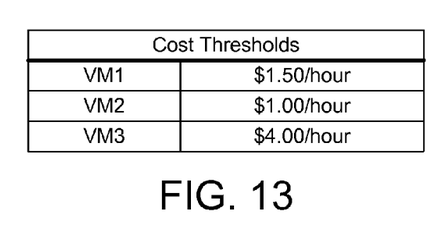
FIG. 13 is a block diagram showing specified cost thresholds for the three virtual machines shown in FIG. 12.
Figure 14:
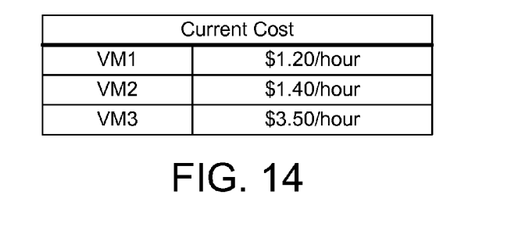
FIG. 14 is a block diagram showing current cost for the three virtual machines shown in FIG. 12.
Figure 15:
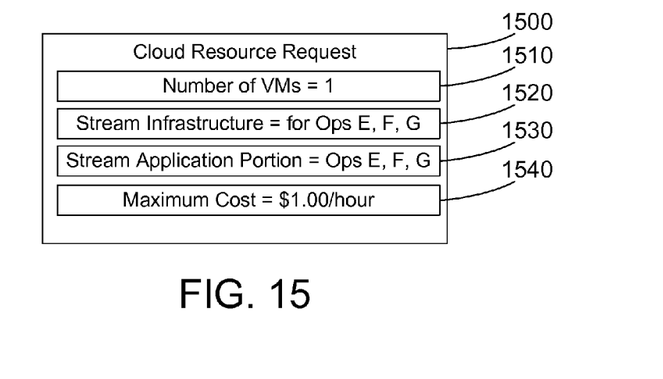
FIG. 15 is a sample cloud resource request for requesting a VM from the cloud manager that has a cost less than a specified maximum cost.
Figure 16:
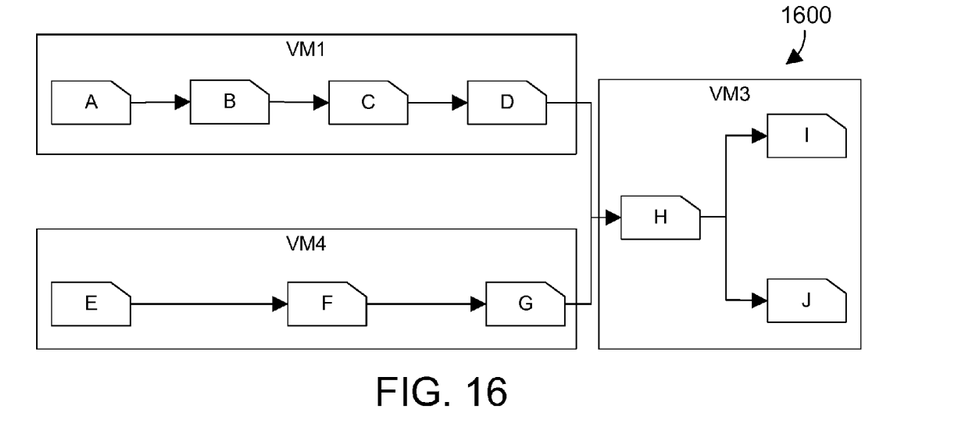
FIG. 16 is a block diagram showing the flow diagram in FIG. 12 after the operators E, F and G have been deployed to a different virtual machine to improve the cost of executing the streaming application.

We assume there are three cost thresholds specified for VM1, VM2 and VM3, as shown in FIG. 13. The cost thresholds in FIG. 13 are suitable examples of cost thresholds 522 shown in FIG. 5, expressed in U.S. dollars per hour. Of course, other currencies and other units could be used. For example, suitable cost thresholds could be expressed in Japanese Yen per processor cycle, Euros per unit of memory, or Mexican Peso per unit of input/outputs (I/Os). These cost thresholds in FIG. 13 are preferably maximum cost for each VM. The current cost of each VM is shown in FIG. 14. The current cost for each VM is preferably computed by the VM cost monitor mechanism 520 shown in FIG. 5. When current cost exceeds the cost thresholds in FIG. 13, the streams manager will take action in an attempt to reduce the cost so each VM operates under its specified cost threshold shown in FIG. 13. For this example, we see the current cost of $1.40 per hour for VM2 in FIG. 14 is greater than the cost threshold $1.00 per hour for VM2 in FIG. 13. As a result, the streams manager determines that deploying VM2 to a server in a cloud results in a lower cost. The streams manager then generates a cloud resource request 1500 as shown in FIG. 15. Note that cloud resource request 1500 is one suitable example for cloud resource request 540 in FIG. 5. Cloud resource request 1500 in FIG. 15 specifies to create one VM at 1510, specifies stream infrastructure (i.e., operating system and middleware) for operators E, F and G at 1520, specifies that operators E, F and G are to be deployed on the one requested VM at 1530, and specifies a maximum cost of $1.00 per hour at 1540. In response, the cloud manager finds a VM that has a cost less than the specified maximum cost of $1.50 per hour, provisions the requested VM, and returns the requested VM to the streams manager. In response, the streams manager deploys operators E, F and G on the newly provisioned VM in the cloud, which is show as VM4 in FIG. 16. The flow diagram 1600 shows the streaming application in FIG. 12 after the operators that were deployed to VM2 in FIG. 12 have been moved to VM4.

A streams manager monitors cost of one or more VMs hosting a streaming application, determines when cost can be reduced, and requests a cloud manager provision one or more VMs that have a lower cost. In response, the cloud manager provisions the VM(s) that have the lower cost. The streams manager then deploys a portion of the streaming application to the VM(s), thereby reducing the cost of running the streaming application.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor, the method comprising:
   decreasing a monetary cost of executing a streaming application on a plurality of virtual machines by:
      executing, by the at least one processor, the streaming application that comprises a flow graph that includes a plurality of operators that process a plurality of data tuples:
      determining, by the at least one processor, the monetary cost of executing the streaming application, wherein the monetary cost of executing the streaming application comprises:
         a monetary cost of hosting the plurality of virtual machines that execute the streaming application;
         a bandwidth monetary cost of the plurality of virtual machines that execute the streaming application;
         a monetary cost of supporting the plurality of virtual machines that execute the streaming application, wherein the monetary cost of supporting the plurality of virtual machines comprises a cost of starting a server to host at least one of the plurality of virtual machines; and
         a billing policy of the plurality of virtual machines that execute the streaming application, wherein the billing policy comprises discounts and overage charges;
      when a monetary cost of executing a portion of the streaming application can be reduced by maintaining enough buffer to ensure the overage charges are unlikely to occur:
         submitting, by the least one processor, a request to a cloud manager to provision at least one virtual machine that has a monetary cost less than a maximum monetary cost specified in the request; and
         after the cloud manager provisions the at least one virtual machine that has the monetary cost less than the maximum monetary cost specified in the request, modifying, by the at least one processor, the flow graph to deploy the portion of the streaming application to the at least one virtual machine.

\* \* \* \* \*